(12) United States Patent
Gygli et al.

(10) Patent No.: US 12,154,020 B2
(45) Date of Patent: Nov. 26, 2024

(54) COMPATIBLE NEURAL NETWORKS

(71) Applicant: Google LLC, Mountain View, CA (US)

(72) Inventors: Michael Gygli, Zurich (CH); Jasper Reinout Robertus Uijlings, Zurich (CH); Vittorio Carlo Ferrari, Zurich (CH)

(73) Assignee: Google LLC, Mountain View, CA (US)

( * ) Notice: Subject to any disclaimer, the term of this patent is extended or adjusted under 35 U.S.C. 154(b) by 846 days.

(21) Appl. No.: 17/339,898

(22) Filed: Jun. 4, 2021

(65) Prior Publication Data

US 2021/0383195 A1     Dec. 9, 2021

Related U.S. Application Data

(60) Provisional application No. 63/034,666, filed on Jun. 4, 2020.

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
CPC ................................ G06N 3/045; G06N 3/08
See application file for complete search history.

(56) References Cited

U.S. PATENT DOCUMENTS

2019/0114545 A1* 4/2019 Lee ........................ G06N 3/08

OTHER PUBLICATIONS

Achille et al, "Task2vec: Task embedding for meta-learning," ICCV, 2019, 10 pages.
Aljundi et al, "Memory aware synapses: Learning what (not) to forget, " ECCV, 2018, 16 pages.
Aljundi et al, "Task-free continual learning," CVPR, 2019, 10 pages.
Ba et al, "Do deep nets really need to be deep?" NeurIPS, 2014, 9 pages.
Ben-David et al, A theory of learning from different domains, Machine Learning, 2010, 25 pages.
Bucila et al, "Model compression," ACM SIGKDD, 2006, 7 pages.
Chatterji et al, "The intriguing role of module criticality in the generalization of deep networks," arXiv, Dec. 2, 2019, 24 pages.
Chen et al, "Progressive feature alignment for unsupervised domain adaptation," CVPR, 2019, 10 pages.

(Continued)

*Primary Examiner* — James T Tsai
(74) *Attorney, Agent, or Firm* — Fish & Richardson P.C.

(57) ABSTRACT

A method for training a plurality of task neural networks such that the trained task neural networks are compatible with each other is described. The method includes receiving, for each of the plurality of task neural networks, a respective training data set; forming an auxiliary loss function for the plurality of task neural networks, in which the auxiliary loss function ensures that the trained task neural networks would be compatible with each other; and training the plurality of task neural networks to optimize a combined loss function. The combined loss function is a combination of respective task loss functions for the respective machine learning tasks and an auxiliary loss function that encourages compatibility between the task neural networks.

21 Claims, 3 Drawing Sheets

(56) References Cited

OTHER PUBLICATIONS

Choromanska et al, "The loss surfaces of multilayer networks," Artificial Intelligence and Statistics, 2015, 13 pages.
Chrabaszcz et al, "A downsampled variant of imagenet as an alternative to the cifar datasets," arXiv, Jul. 27, 2017, 8 pages.
Coates et al, An analysis of single-layer networks in unsupervised feature learning, AISTATS, 2011, 9 pages.
Dixon et al, "Measuring and mitigating unintended bias in text classification," In Proceedings of the 2018 AAAI/ACM Conference on AI, Ethics, and Society, Feb. 2, 2018, 7 pages.
Doersch et al, "Multi-task self-supervised visual learning," ICCV, 2017, 10 pages.
Donahue et al, "Decaf: A deep convolutional activation feature for generic visual recognition," MLR Press, 2014, 9 pages.
Dosovitskiy et al, "Discriminative unsupervised feature learning with convolutional neural networks," NeurIPS, Jun. 26, 2014, 13 pages.
Dwivedi et al, "Representation similarity analysis for efficient task taxonomy & transfer learning," CVPR, 2019, 10 pages.
Farquhar et al, "Towards robust evaluations of continual learning," arXiv, May 24, 2018, 18 pages.
Frome et al, "DeViSE: A deep visual-semantic embedding model," in NeurIPS, 2013, 11 pages.
Ganin et al, "Unsupervised domain adaptation by backpropagation," ICML, 2014, 10 pages.
Ganin et al, "Domain-adversarial training of neural networks," JMLR, Apr. 2016, 35 pages.
Ghifary et al, "Deep reconstructionclassification networks for unsupervised domain adaptation," arXiv, Aug. 1, 2016, 21 pages.
Gidaris et al, "Unsupervised representation learning by predicting image rotations," arXiv, Mar. 21, 2018, 16 pages.
Gupta et al, "Cross modal distillation for supervision transfer," CVPR, 2016, 10 pages.
Han et al, "Deep compression: Compressing deep neural networks with pruning, trained quantization and huffman coding," arXiv, Feb. 15, 2016, 14 pages.
Hardt et al, "Equality of opportunity in supervised learning," arXiv, Oct. 7, 2016, 22 pages.
He et al, "Mask r-cnn," ICCV, 2017, 9 pages.
He et al, "Deep residual learning for image recognition," CVPR, 2016, 9 pages.
Hinton et al, "Distilling the knowledge in a neural network," arXiv, Mar. 9, 2015, 9 pages.
Iandola et al, "Squeezenet: Alexnet-level accuracy with 50x fewer parameters and <1mb model size," arXiv, Nov. 4, 2016, 13 pages.
Ioffe et al, "Batch normalization: Accelerating deep network training by reducing internal covariate shift," ICML, 2015, 9 pages.
Karpathy et al, "Deep visual-semantic alignments for generating image descriptions," CVPR, 2015, 10 pages.
Kirkpatrick et al, "Overcoming catastrophic forgetting in neural networks," Proc. Nat, Acad. Sci., 2017, 6 pages.
Krizhevsky et al, "Learning multiple layers of features from tiny images," Technical Report: University of Toronto, Apr. 8, 2009, 60 pages.
Kumar et al, "Co-regularized alignment for unsupervised domain adaptation," arXiv, Nov. 13, 2018, 12 pages.
Lee et al, "Drop to adapt: Learning discriminative features for unsupervised domain adaptation," ICCV, 2019, 10 pages.
Lenc et al, "Understanding Image Representations by Measuring Their Equivariance and Equivalence," IJCV, 2019, 9 pages.
Li et al, "Revisiting batch normalization for practical domain adaptation," arXiv, Nov. 8, 2016, 12 pages.
Li et al, "Convergent learning: Do different neural networks learn the same representations?," arXiv, Jan. 8, 2016, 21 pages.
Li et al, "Learning without forgetting," IEEE Transactions on Pattern Analysis and Machine Intelligence, Nov. 14, 2017, 13 pages.
Lu et al, "Shared representational geometry across neural networks," arXiv, Nov. 28, 2018, 7 pages.
Maninis et al, "Attentive single-tasking of multiple tasks," CVPR, 2019, 10 pages.
Mehrer et al. "Beware of the beginnings: intermediate and higher level representations in deep neural networks are strongly affected by weight initialization," Conference on Cognitive Computational Neuroscience, 2018 4 pages.
Michieli et al, "Incremental learning techniques for semantic segmentation," ICCV Workshop, 2019, 8 pages.
Marcos et al, "Insights on representational similarity in neural networks with canonical correlation," arXiv, Oct. 23, 2018, 17 pages.
Ngiam et al, "Domain adaptive transfer learning with specialist models," arXiv, Dec. 11, 2018, 10 pages.
Noroozi et al, "Unsupervised learning of visual representations by solving jigsaw puzzles," arXiv, Aug. 22, 2017, 19 pages.
Rebuffi et al, "Incremental classifier and representation learning," CVPR, 2017, 10 pages.
Ren et al, "Faster R-CNN: Towards real-time object detection with region proposal networks," arXiv, Jun. 4, 2015, 10 pages.
Romero et al, "Fitnets: Hints for thin deep nets," arXiv, Jan. 9, 2015, 12 pages.
Roy et al, "Unsupervised domain adaptation using feature-whitening and consensus loss," CVPR, 2019, 10 pages.
Russakovsky et al, "ImageNet large scale visual recognition challenge," arXiv, Jan. 30, 2015, 43 pages.
Saito et al, "Asymmetric tri-training for unsupervised domain adaptation," ICML, 2017, 10 pages.
Sandler et al, Mobilenetv2: Inverted residuals and linear bottleneck, CVPR, 2018, 11 pages.
Razavian et al, CNN features off-the-shelf: an astounding baseline for recognition, CVPR, 2014, 8 pages.
Shmelkov et al, "Incremental learning of object detectors without catastrophic forgetting, " ICCV, 2017, 10 pages.
Shu et al, A dirt-t approach to unsupervised domain adaptation, ICLR, 2018, 19 pages.
Socher et al, "Zero-shot learning through cross-modal transfer," arXiv, Jan. 16, 2013, 7 pages.
Stubell et al, "Energy and policy considerations for deep learning in nlp," arXiv, Jun. 5, 2019, 6 pages.
Sun et al, "Unsupervised domain adaptation through self-supervision," arXiv, Sep. 26, 2019, 15 pages.
Tan et al, "Efficientnet: Rethinking model scaling for convolutional neural networks," ICML, 2019, 10 pages.
Tenenbaum et al, "How to grow a mind: Statistics, structure, and abstraction," Science, 2011, 8 pages.
Tschannen et al, "Self-supervised learning of video-induced visual invariances," CVPR, 2020, 10 pages.
Tzeng et al, "Deep domain confusion: Maximizing for domain invariance," arXiv, Dec. 10, 2014, 9 pages.
Urban et al, "Do deep convolutional nets really need to be deep and convolutional?" arXiv, Mar. 4, 2017, 13 pages.
Wang et al, "Towards understanding learning representations: To what extent do different neural networks learn the same representation, " arXiv, Oct. 28, 2018, 17 pages.
Wang et al, Deep visual domain adaptation: A survey, Neurocomputing, Oct. 27, 2018, 19 pages.
Yan et al, "Neural data server: A large-scale search engine for transfer learning data," arXiv, Jan. 9, 2020, 13 pages.
Yu et al, "Slimmable neural networks," arXiv, Dec. 21, 2018, 12 pages.
Zagoruyko et al, "Wide residual networks," BMVC, May 23, 2016, 13 pages.
Zamir et al, "Taskonomy: Disentangling task transfer learning," CVPR, 2018, 11 pages.
Zamir et al, "Feedback networks," CVPR, Jan. 13, 2017, 11 pages.
Zenke et al, "Continual learning through synaptic intelligence," ICML, 2017, 9 pages.
Zhai et al, "S4L: Self-Supervised Semi-Supervised Learning," ICCV, 2019, 10 pages.
Zhai et al, "A large-scale study of representation learning with the visual task adaptation benchmark," arXiv, Feb. 21, 2020, 33 pages.
Zhang et al, "Are all layers created equal?" ICML Workshop Deep Phenomena, Feb. 6, 2019, 20 pages.

(56) References Cited

OTHER PUBLICATIONS

Zhang et al, "Collaborative and adversarial network for unsupervised domain adaptation," CVPR, 2018, 9 pages.

* cited by examiner

COMPATIBLE NEURAL NETWORKS

CROSS REFERENCE TO RELATED APPLICATIONS

This application is a non-provisional of and claims priority to U.S. Provisional Patent Application No. 63/034,666, filed on Jun. 4, 2020, the entire contents of which are hereby incorporated by reference.

BACKGROUND

This specification relates to training machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that trains multiple task neural networks such that the trained task neural networks are compatible with each other. Each of the multiple task neural networks is configured to perform a respective machine learning task.

The subject matter described in this specification can be implemented in particular embodiments so as to realize one or more of the following advantages. Rather than training multiple neural networks for different tasks independently, the techniques described in this specification adapt the process of training the neural networks to produce network components that are compatible across different tasks. By splitting each of the neural networks into two parts: a feature extractor and a predictor (e.g., a classifier) and initializing these feature extractors and predictors using identical initial weights, the techniques described herein can train the neural networks to be compatible with each other without degrading task accuracy compared to training the networks independently. That is, the trained feature extractor of one network can be recombined with the trained predictor of the another network to form a new neural network that still performs reasonably well on a similar machine learning task (e.g., producing predictions that are significantly better than chance), without requiring any fine-tuning after recombination.

Further, given previously trained components, by using an incremental training regime, the described techniques can train new components to be compatible with the previously trained ones in a computationally efficient manner. When network components become highly compatible, they can be interchanged at no loss of accuracy.

The training techniques described in this specification are particularly useful in applications such as unsupervised domain adaptation where the goal is to transfer knowledge from a source domain, for which labeled data is given, to a target domain, for which only unlabeled data is available. In particular, the system first trains a neural network model on a source training dataset. The system then adapts the feature extractor neural network of the model to the target domain while retaining compatibility with the original predictor neural network. The system then recombines this updated feature extractor neural network with the predictor neural network trained on the source domain to predict classes on the target domain. This training method is significantly simpler and less computationally expensive than competing approaches that jointly train a model on both domains.

Further, compatibility between feature extractors based on different architectures can be obtained by making use of the described techniques. This compatibility enables transferring task heads across feature extractors. As a practical application, considering a single classification task which runs on many devices with a hardware-tailored network architecture for each device (e.g. a powerful server, a standard desktop, a mobile phone), if a conventional approach is used, every time the set of classes to be recognized changes, all networks need to be retrained. Instead, by making use of the described approach, the feature extractors of all networks are compatible and only one extractor and its corresponding predictor neural network (e.g., classifier) need to be retrained. The system can then transfer that predictor neural network (e.g., classifier) to all other models. This would greatly facilitate deployment of the updated predictor (e.g., updated classifier) to all client devices.

In addition, the techniques described in this specification are useful in transfer learning, where the goal is to produce good results on a target task by reusing parts of a model that was trained on a related source task. By making use of the described approach, the system can transfer a feature extractor of a source neural network that is pre-trained on a source task to a target network which is configured to performed a target task, while reusing an existing target predictor neural network of the target neural network, allowing the transfer learning process to be faster and more computationally efficient compared to other alternative approaches such as retraining the target predictor neural network from scratch.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains multiple task neural networks such that the trained task neural networks are compatible with each other. Each of the multiple task neural networks is configured to perform a respective machine learning task.

For example, a respective machine learning task may be a classification task, such as an image processing task, a speech recognition task, a natural language processing task, or an optical character recognition task. For instance, the task may be image classification and the output generated by the corresponding task neural network for a given image may be scores for each of a set of object categories, with each score representing an estimated likelihood that the image contains an image of an object belonging to the category. As another example, the task can be image embedding generation and the output generated by the corresponding task neural network can be a numeric embedding of the input image. As yet another example, the task can be object detection and the output generated by the corresponding task neural network can identify locations in the input image at which particular types of objects are depicted. As yet another example, the task can be image segmentation and the output generated by the corresponding task neural network can assign each pixel of the input image to a category from a set of categories.

As another example, if the inputs to a task neural network are Internet resources (e.g., web pages), documents, or portions of documents or features extracted from Internet resources, documents, or portions of documents, the task can be to classify the resource or document, i.e., the output generated by the task neural network for a given Internet resource, document, or portion of a document may be a score for each of a set of topics, with each score representing an estimated likelihood that the Internet resource, document, or document portion is about the topic.

As another example, if the inputs to a task neural network are features of an impression context for a particular advertisement, the output generated by the task neural network may be a score that represents an estimated likelihood that the particular advertisement will be clicked on.

As another example, if the inputs to a task neural network are features of a personalized recommendation for a user, e.g., features characterizing the context for the recommendation, e.g., features characterizing previous actions taken by the user, the output generated by the task neural network may be a score for each of a set of content items, with each score representing an estimated likelihood that the user will respond favorably to being recommended the content item.

As another example, if the input to a task neural network is a sequence of text in one language, the output generated by a task neural network may be a score for each of a set of pieces of text in another language, with each score representing an estimated likelihood that the piece of text in the other language is a proper translation of the input text into the other language.

As another example, the machine learning task may be an audio processing task. For example, if the input to a task neural network is a sequence representing a spoken utterance, the output generated by the task neural network may be a score for each of a set of pieces of text, each score representing an estimated likelihood that the piece of text is the correct transcript for the utterance. As another example, if the input to the task neural network is a sequence representing a spoken utterance, the output generated by the task neural network can indicate whether a particular word or phrase ("hotword") was spoken in the utterance. As another example, if the input to the task neural network is a sequence representing a spoken utterance, the output generated by the task neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

Each of the multiple task neural networks includes a respective feature extractor neural network and a respective predictor neural network. The respective feature extractor neural network has a respective set of feature extractor parameters and the respective predictor neural network has a respective set of predictor parameters.

Figure 1:
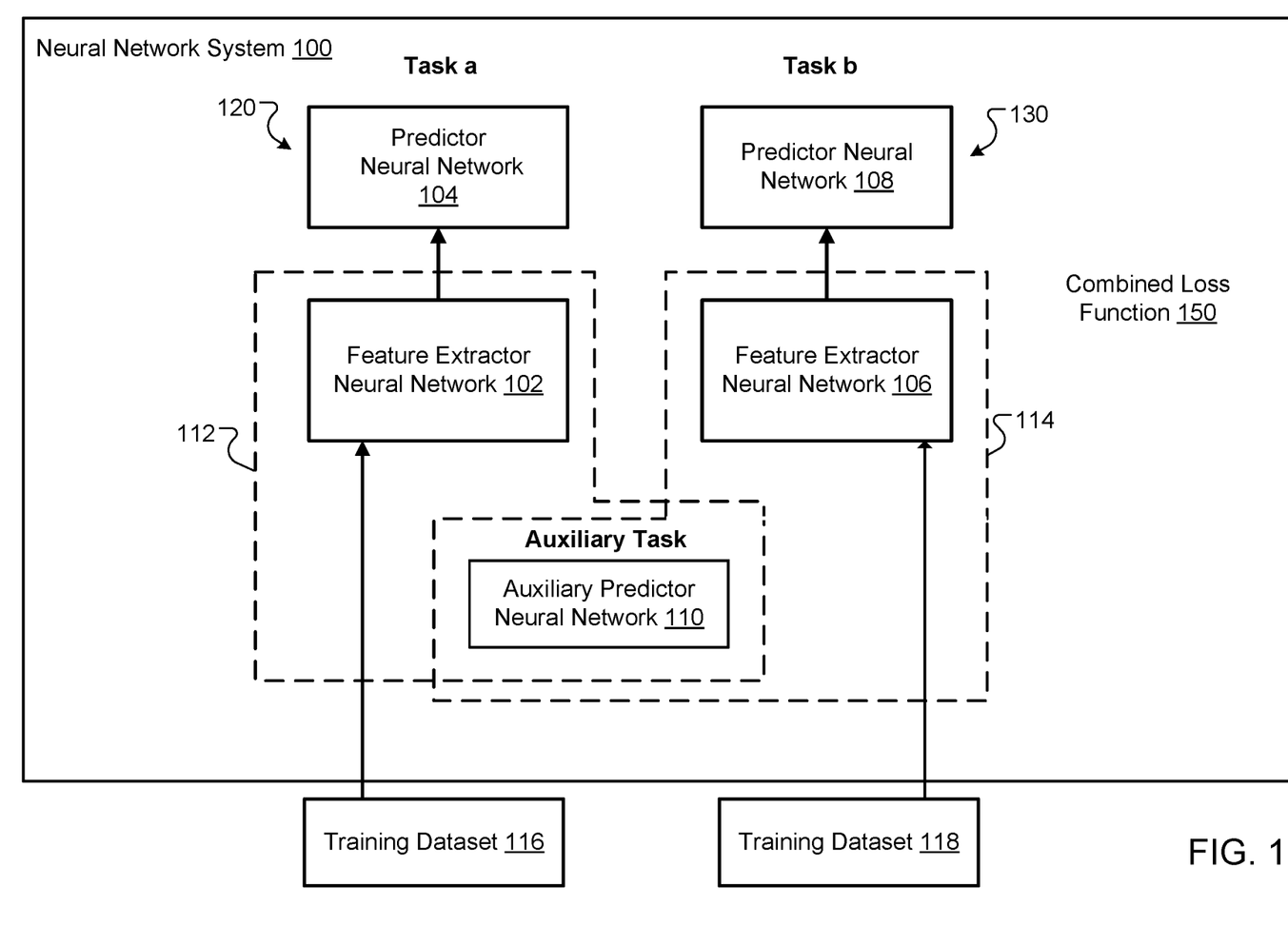
FIG. 1 shows an example neural network system that includes a plurality of task neural networks.

FIG. 1 shows an example neural network system 100. The system 100 is an example of a system implemented as computer programs on one or more computers in one or more locations, in which the systems, components, and techniques described below can be implemented.

The system 100 includes multiple task neural networks. Each of the multiple task neural networks is configured to perform a respective machine learning (ML) task. Each task neural network includes at least two components: (i) a respective feature extractor neural network that is configured to extract features from a respective network input, and (ii) a respective predictor neural network that is configured to process the features to generate a respective network output in order to perform the respective ML task.

For example, as shown in FIG. 1, the system 100 includes a task neural network 120 configured to perform task a and a task neural network 130 configured to perform task b. The task neural network 120 includes a feature extractor neural network 102 and a predictor neural network 104. The task neural network 130 includes a feature extractor neural network 106 and a predictor neural network 108.

Each feature extractor neural network, denoted as f(.), has a respective set of feature extractor parameters, denoted as $\Phi$. Each predictor neural network, denoted as h(.), has a respective set of predictor parameters, denoted as $\theta$.

In standard supervised learning, a neural network may be trained on task t by minimizing a task loss $l_t(h(f(x_i;\Phi_t);\Theta_t), y_i)$ over all examples $x_i$ with label $y_i$ in dataset $D_t$. A standard network trained on task t, using a respective feature extractor neural network and a respective predictor neural network of task t, can be denoted as $n_{tt}(x_i)$.

When independently training two task neural networks on tasks a and b by minimizing their respective losses $I_a(.)$ and $I_b(.)$, the resulting trained networks are incompatible, because recombining components of the two trained networks into a new network (e.g., a new network $n_{ab}(x_i)=h(f(x_i;\Phi_a);\Theta_b)$ or $n_{ba}(.)$) would likely produce random or systematically wrong predictions. This is because the two feature extractors generally learn features responding to different patterns (e.g., different image patterns), with different scaling of activation values, and even equivalent feature channels will appear in arbitrary orders.

Thus, rather than training multiple neural networks for different tasks independently, the techniques described in this specification adapt the process of training the neural networks to produce trained neural networks that are compatible with each other across different tasks. Two neural networks are compatible if the performance of a new neural network that is formed by combining one component of one of the two neural networks with one component of the other neural network on a particular machine learning task exceeds a threshold level of performance. For example, compatibility can be defined based on the performance of recombined networks such as networks $n_{ab}(.)$ and $n_{ba}(.)$. When these networks perform at chance level, the components of $n_{ab}(.)$ and $n_{ba}(.)$ are considered incompatible. Instead, they are compatible when the performance of $n_{ab}(.)$ and $n_{ba}$) exceeds a threshold level (e.g., when $n_{ab}(.)$ and $n_{ba}$) directly output predictions that are significantly better than chance) without any fine-tuning after recombination. Generally, the recombined networks will not exceed the performance of the original task neural networks $n_{aa}(.)$ and $n_{bb}(.)$ trained and tested on their own task without recombining any component. Thus, this performance can be defined as the practical upper bound. When the recombined networks reach this upper bound, they are perfectly compatible, which allows to use their components interchangeably.

Referring to FIG. 1, to train multiple task neural networks such that the trained task neural networks are compatible with each other, the system 100 receives, for each of the multiple task neural networks, a respective training data set for the respective machine learning task. The respective training data set includes multiple training samples. Each training sample has a corresponding sample input, denoted as $x_i$, and a corresponding sample output, denoted as $y_i$ (also referred to as a label $y_i$). For example, the system 100 receives training datasets 116 and 118 for task a and task b, respectively.

The system 100 forms an auxiliary loss function for the plurality of task neural networks. The auxiliary loss function encourages compatibility between the trained task neural networks. In particular, the auxiliary loss measures, for each of the task neural networks, a level of performance on an auxiliary task of a respective new task neural network that is formed by combining the feature extractor neural network of the task neural network with an auxiliary predictor neural network for the auxiliary task.

In some implementations, the auxiliary task associated with each new task neural network is a self-supervised machine learning task. The self-supervised machine learning task is associated with an auxiliary training data set that comprises auxiliary training samples, in which the auxiliary training samples have auxiliary sample inputs that are all sample inputs in all training data sets associated with all machine learning tasks. Each of the auxiliary training samples has an auxiliary sample output that is a transformation of a corresponding auxiliary sample input in the auxiliary training sample. The self-supervised machine learning task is to predict which transformation is applied to an auxiliary sample input to obtain a corresponding auxiliary sample output. For example, given that an input x is transformed by g(x, s), a function which applies a transformation s on the input x, an auxiliary task is to predict what transformation was applied.

As shown in FIG. 1, the auxiliary task is associated with an auxiliary predictor neural network 110 which can be combined with the feature extractor neural network of each of the task neural networks to form a respective new task neural network that is configured to perform the auxiliary task. The auxiliary predictor neural network 110 operates on features produced by the respective feature extractor neural network. For example, the auxiliary predictor neural network 110 can be denoted as $s(f(x;\Phi_t);\Theta_s)$, where $\theta_s$ denotes a set of auxiliary predictor parameters of the auxiliary predictor neural network 110. In FIG. 1, a new task neural network 112 is formed by combining the feature extractor neural network 102 with the auxiliary predictor neural network 110, and a new task neural network 114 is formed by combining the feature extractor neural network 106 with the auxiliary predictor neural network 110.

The system 100 then trains the task neural networks to optimize a combined loss function 150 that is a combination of respective task loss functions for the respective machine learning tasks and the auxiliary loss function. For example, the combined loss function 150 can be expressed as follows:

$$\sum_{i\in[a,b]} \sum_{(x_i,y_i)\in \mathcal{D}_t} \left[ \ell_t(h(f(x_i;\Phi_t);\Theta_t), y_i) + \frac{1}{|S|}\sum_{s\in S} \ell_s(h(f(g(x_i,s);\Phi_t);\Theta_s), s) \right] \quad (1)$$

where $\ell_t(h(f(x_i;\Phi_t);\Theta_t);y_i)$ represents the task loss function for each machine learning task t, $$\frac{1}{|S|}\sum_{s\in S} \ell_s(h(f(g(x_i,s);\Phi_t);\Theta_s), s)$$

represents the auxiliary loss function, S is set of possible transformations that are applied, $\theta_s$ is the set of auxiliary predictor parameters of the auxiliary predictor neural network 110 and $l_s$ is its associated loss. While there are feature extractor parameters $\Phi_t$ and predictor parameter $\theta_t$ specific to each task, the auxiliary task parameters $\theta_s$ are shared across all tasks. This forces the feature extractor neural network $f(x_i;\Phi_t)$ of each task t to produce features that are compatible with the same auxiliary predictor neural network 110.

In some implementations, when tasks a and b have common classes, these common classes can be directly used to achieve compatibility (rather than resorting to a self-supervised loss). In these implementations, an auxiliary predictor neural network c, which discriminates among these common classes, can be used for training. Specifically, the system 100 trains the multiple task neural networks by minimizing the following combined loss function:

$$\sum_{t\in[a,b]} \sum_{(x_i,y_i)\in \mathcal{D}_t} [\ell_t(h(f(x_i;\Phi_t);\Theta_t), y_i) + \ell_c(h(f(x_i;\Phi_t);\Theta_c), y_i) \cdot 1[y_i \in C]] \quad (2)$$

where $l_c$ is the auxiliary loss function. The auxiliary loss function is computed only over examples in the set of common classes C (1 is an indicator function returning 1 if its argument is true and 0 otherwise).

In some implementations, the system 100 can train the multiple neural networks using joint training. The system 100 minimizes the combined loss function (e.g., the combined loss function in Equation (1) or (2)) by alternating between tasks (e.g., alternating between tasks a and b), and each time the system 100 minimizes the combined loss over a batch of training samples coming (sequentially) from the respective training data set of each of the plurality of task neural networks. By training jointly, all tasks (e.g., both tasks a and b) can influence the auxiliary predictor parameters of the auxiliary predictor neural network and use the auxiliary predictor neural network to solve the auxiliary task.

In some other implementations, the training of the plurality of task neural networks to optimize the combined loss function is an incremental training. The system 100 first trains one of the task neural networks, e.g., the task neural network $n_{aa}$, by minimizing the combined loss function over the respective task only. For example, the system trains the task neural network $n_{aa}$(120) by minimizing the combined loss function in Equation (1) or (2) over task a only. This allows the system 100 to determine the values of auxiliary predictor parameters of the auxiliary predictor neural network 110. The system 100 then incrementally trains each of the remaining task neural networks on the corresponding ML task (for example, training the task neural network $n_{bb}$ on task b), but use the auxiliary predictor neural network 110 with its parameters frozen. This training technique encourages compatibility between all tasks without requiring all of them to be trained at the same time. For example, this encourage compatibility between the task neural networks $n_{aa}$ and $n_{bb}$, without requiring both of them to be trained at the same time.

After training, in some implementations, the system 100 may use at least two of the plurality of task neural networks that were trained by the methods described above to generate a new task neural network. In particular, the system may generate a new task neural network by combining a trained feature extractor neural network of one of the at least two trained task neural networks with a trained predictor neural network of the other of the at least two trained task neural networks. The system can then process, using the new task neural network, a machine learning input to generate a machine learning output without re-training the new task neural network. Alternatively or additionally, the system can provide the new task neural network to another system that uses the new task neural network to process a new input to generate a new output.

In some other implementations, when there is a new machine learning task, the system can generate a new task neural network by combining a trained feature extractor neural network of one of the trained task neural networks with a new predictor neural network. The new task neural network is configured to perform a new machine learning task. The system then trains at least the new predictor neural network on the new machine learning task.

While FIG. 1 illustrates two task neural networks 120 and 130 for illustration purposes, the described training techniques can apply to any number of task neural networks.

Figure 2:
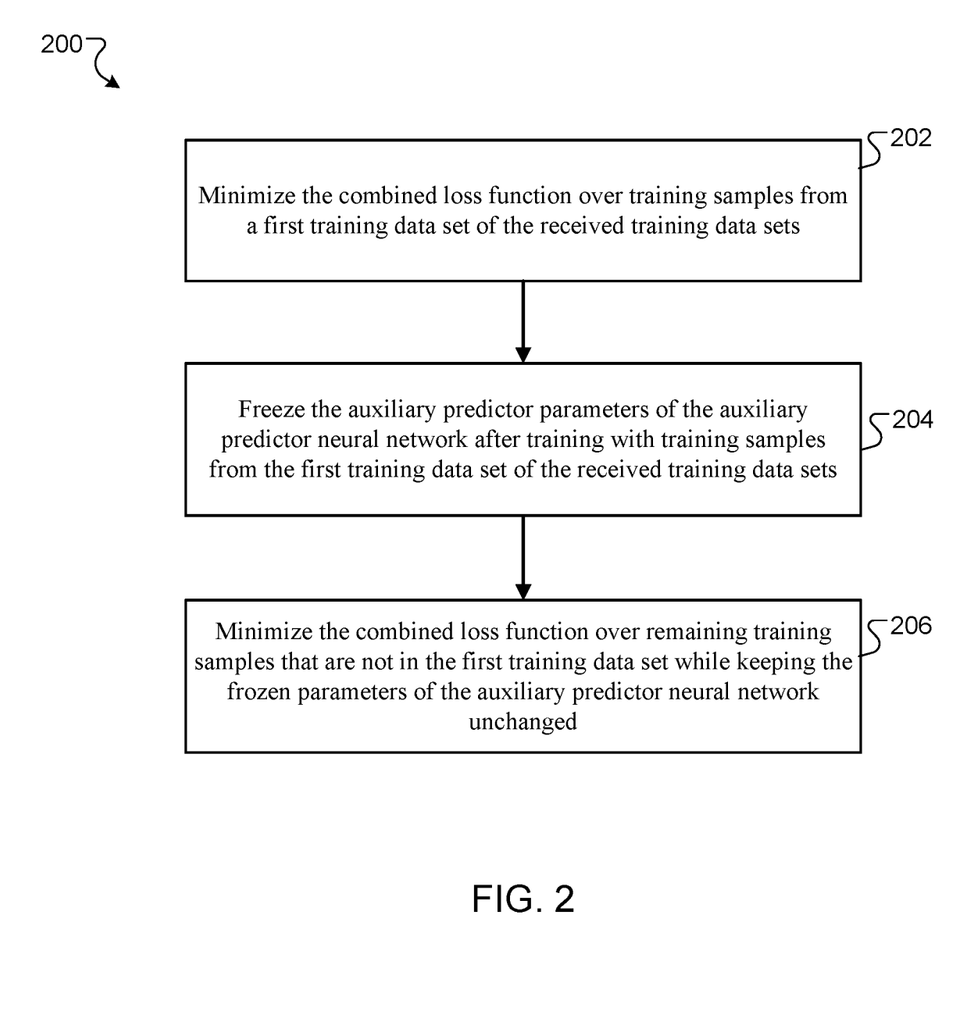
FIG. 2 is a flow diagram of an example process for training a plurality of task neural networks using incremental training.

FIG. 2 is a flow diagram of an example process 200 for training a plurality of task neural networks using incremental training. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system minimizes the combined loss function over training samples from a first training data set of the received training data sets (step 202). In particular, the system trains a particular task neural network in the plurality of task neural networks by minimizing the combined loss function over training examples in the training data set associated with the task that the particular task neural network is configured to perform. This allows the system to determine the values of auxiliary predictor parameters of the auxiliary predictor neural network.

The system freezes the values of the auxiliary predictor parameters of the auxiliary predictor neural network after training with training samples from the first training data set of the received training data sets (step 204). This means the values of the auxiliary predictor parameters are fixed during the remaining training process.

The system minimizes the combined loss function over remaining training samples that are not in the first training data set while keeping the frozen values of the auxiliary predictor parameters of the auxiliary predictor neural network unchanged (step 206). In particular, the system incrementally trains each of the remaining task neural networks on the corresponding ML task, but uses the auxiliary predictor neural network with its parameters frozen. This training technique encourages compatibility between all tasks without requiring all of them to be trained at the same time.

Figure 3:
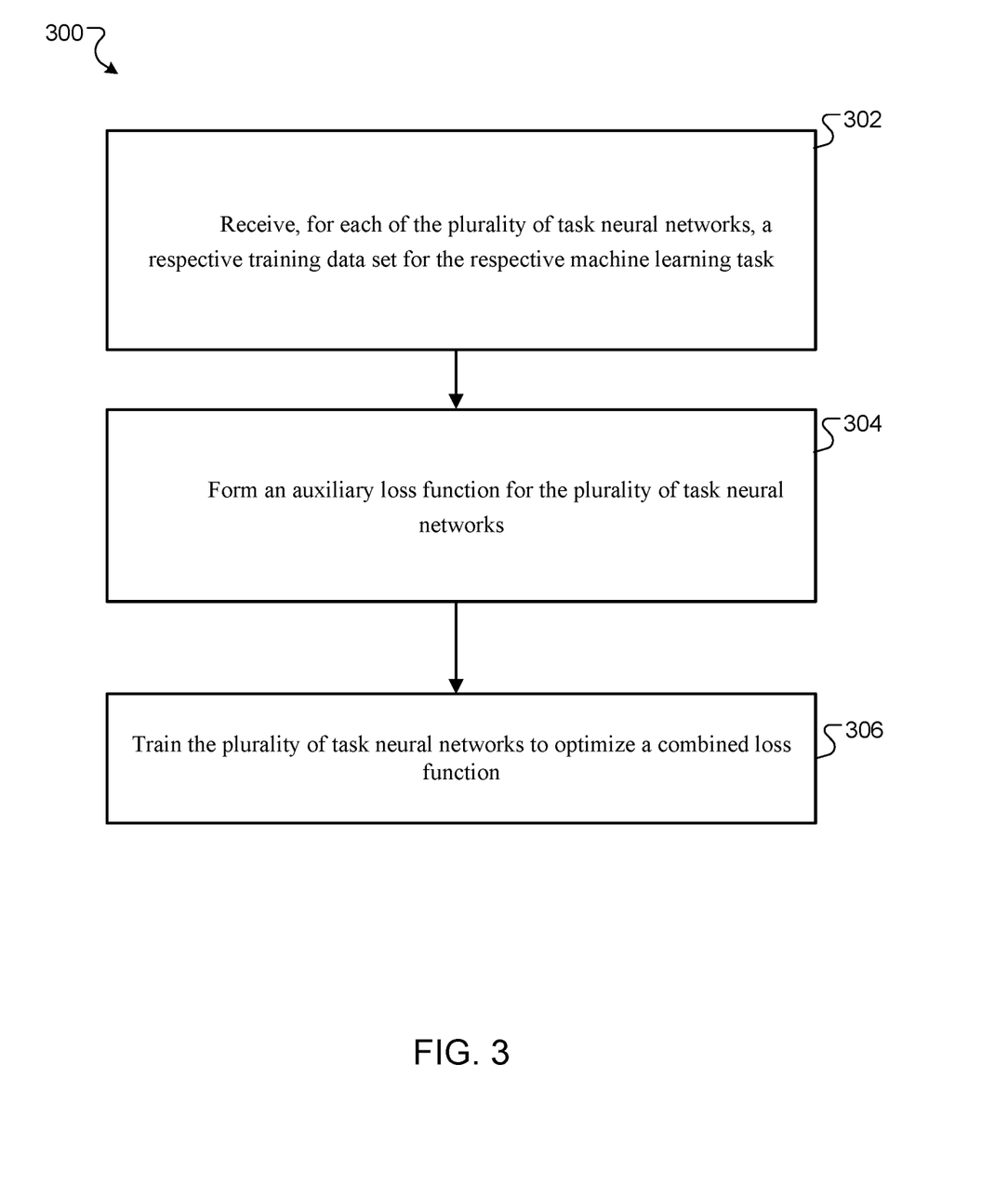
FIG. 3 is a flow diagram of an example process for training a plurality of task neural networks.

FIG. 3 is a flow diagram of an example process 300 for training a plurality of task neural networks such that the trained task neural networks are compatible with each other. For convenience, the process 300 will be described as being performed by a system of one or more computers located in one or more locations. For example, a neural network system, e.g., the neural network system 100 of FIG. 1, appropriately programmed in accordance with this specification, can perform the process 300.

Each of the plurality of task neural networks includes a respective feature extractor neural network and a respective predictor neural network and is configured to perform a respective machine learning task. The respective feature extractor neural network has a respective set of feature extractor parameters and the respective predictor neural network has a respective set of predictor parameters.

In some implementations, the feature extractor neural networks of the plurality of task neural networks have the same feature extractor neural network architecture. In some cases, the feature extractor neural networks are initiated with a same set of initial feature extractor parameters before training.

In some implementations, the predictor neural networks have the same predictor neural network architecture. In some cases, the predictor neural networks are initiated with the same set of initial predictor parameters before training.

To train the plurality of task neural networks, the system receives, for each of the plurality of task neural networks, a respective training data set for the respective machine learning task (step 302). Each machine learning task may be one of a plurality of tasks including (i) a classification task, (ii) and regression task, and (iii) an image recognition task. The respective training data set comprising a plurality of training samples. Each training sample has a corresponding sample input and a corresponding sample output.

The system forms an auxiliary loss function for the plurality of task neural networks (step 304). The auxiliary loss function ensures that the trained task neural networks would be compatible with each other. In particular, the auxiliary loss function measures, for each of the task neural networks, a level of performance on an auxiliary task of a new task neural network for the auxiliary task that is formed by combining the feature extractor neural network of the task neural network with a new predictor neural network for the auxiliary task. The new predictor neural network is the same for all of the new task neural networks.

The new task neural networks and the plurality of task neural networks may have the same feature extractor neural network architecture. Each of the new predictor neural networks may have a new predictor neural network architecture different from the architectures of the predictor neural networks of the task neural networks.

In some implementations, the auxiliary task associated with each new task neural network is a self-supervised machine learning task. The self-supervised machine learning task is associated with an auxiliary training data set that comprises auxiliary training samples, in which the auxiliary training samples have auxiliary sample inputs that are all sample inputs in all training data sets associated with all machine learning tasks. Each of the auxiliary training samples has an auxiliary sample output that is a transformation of a corresponding auxiliary sample input in the auxiliary training sample. The self-supervised machine learning task is to predict which transformation is applied to an auxiliary sample input to obtain a corresponding auxiliary sample output. The auxiliary sample output is a probability distribution over a set of possible transformations. For example, the auxiliary sample input is an input image and the auxiliary sample output is an output image. The input image is transformed to an output image by rotating the input image with one angle in the set of rotation angles S (for example $\mathcal{S} = \{0°, 90°, 180°, 270°\}$. In this example, the set of possible transformations includes the set of possible rotation angles that can be applied to the input image and the self-supervised machine learning task is to classify which rotation angle was applied to the input image.

The system trains the plurality of task neural networks to optimize a combined loss function (step 306). The combined loss function is a combination of respective task loss functions for the respective machine learning tasks and an auxiliary loss function that encourages compatibility between the task neural networks. In some implementations, the combined loss function is a weighted sum of the respective loss functions and the auxiliary loss function.

In some implementations, the training of the plurality of task neural networks to optimize the combined loss function is a joint training. During the joint training, the combined loss function is minimized over a batch of training samples coming sequentially from the respective training data set of each of the plurality of task neural networks.

In some other implementations, the training of the plurality of task neural networks to optimize the respective combined loss function is an incremental training. During the incremental training, the system minimizes the combined loss function over training samples from a first training data set of the received training data sets, freezes the associated parameters of the auxiliary loss function after training with training samples from the first training data set of the received training data sets, and minimizes the combined loss function over remaining training samples that are not in the first training data set while keeping the frozen parameters of the auxiliary loss function unchanged.

In some implementations, the auxiliary task associated with each new task neural network only applies to common classes between the respective machine learning tasks. In these implementations, the auxiliary task is associated with a training data set with training samples having sample outputs shared in the respective training data sets of the respective machine learning tasks.

The training techniques described in this specification are useful in many applications such as unsupervised domain adaptation where the goal is to transfer knowledge from a source domain, for which labeled data is given, to a target domain, for which only unlabeled data is available. In particular, the system first trains a neural network model on a source training dataset including a feature extractor neural network, a predictor neural network (e.g., a classifier), and an auxiliary predictor neural network. The auxiliary predictor neural network is configured to predict which rotation was applied to an input image given the input image and a corresponding output image. The auxiliary predictor neural network may be initialized from a model trained for the rotation prediction. The system then adapts the feature extractor neural network of the model to the target domain while retaining compatibility with the original predictor neural network. The system does this by freezing the auxiliary predictor neural network while fine-tuning the feature extractor neural network on the unlabeled target training set. The system minimizes a self-supervised rotation prediction loss for a number of steps (e.g., 500, 1000, or 2000 steps). The system then recombines this updated feature extractor neural network with the predictor neural network trained on the source domain to predict classes on the target domain. This training method is significantly simpler and less computationally expensive than competing approaches that jointly train a model on both domains.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a plurality of task neural networks such that the trained task neural networks are compatible with each other, wherein each of the plurality of task neural networks comprises a respective feature extractor neural network and a respective predictor neural network and is configured to perform a respective machine learning task, wherein the respective feature extractor neural network has a respective set of feature extractor parameters and the respective predictor neural network has a respective set of predictor parameters, the method comprising:
    receiving, for each of the plurality of task neural networks, a respective training data set for the respective machine learning task, the respective training data set comprising a plurality of training samples, each training sample having a corresponding sample input and a corresponding sample output;
    forming an auxiliary loss function for the plurality of task neural networks, wherein the auxiliary loss function ensures that the trained task neural networks would be compatible with each other, wherein two trained task neural networks are compatible if the performance of a new neural network that is formed by combining one or more components of one of the two trained task neural networks with one or more components of the other trained task neural network on a particular machine learning task exceeds a threshold level of performance; and
    training the plurality of task neural networks to optimize a combined loss function,
    wherein the combined loss function is a combination of respective task loss functions for the respective machine learning tasks and an auxiliary loss function that encourages compatibility between the task neural networks, and
    wherein the auxiliary loss function measures, for each of the task neural networks, a level of performance on an auxiliary task of a new task neural network for the auxiliary task that is formed by combining the feature extractor neural network of the task neural network with a new predictor neural network for the auxiliary task.

2. The method of claim 1, wherein each machine learning task is one of (i) a classification task, (ii) and regression task, or (iii) an image recognition task.

3. The method of claim 2, wherein the feature extractor neural networks have the same feature extractor neural network architecture.

4. The method of claim 1, wherein the feature extractor neural networks are initiated with a same set of initial feature extractor parameters before training.

5. The method of claim 4, wherein the predictor neural networks have the same predictor neural network architecture.

6. The method of claim 5, wherein the predictor neural networks are initiated with the same set of initial predictor parameters before training.

7. The method of claim 1, wherein the auxiliary task associated with each new task neural network only applies to common classes between the respective machine learning tasks, and
    wherein the auxiliary task is associated with a training data set with training samples having sample outputs shared in the respective training data sets of the respective machine learning tasks.

8. The method of claim 7, wherein the new task neural networks and the plurality of task neural networks have the same feature extractor neural network architecture.

9. The method of claim 7, wherein each of the new task neural networks has a new predictor neural network architecture.

10. The method of claim 1, wherein the auxiliary task associated with each new task neural network is a self-supervised machine learning task, and
    wherein the self-supervised machine learning task is associated with an auxiliary training data set that comprises auxiliary training samples, wherein the auxiliary training samples have auxiliary sample inputs that are all sample inputs in all training data sets associated with all machine learning tasks.

11. The method of claim 10, wherein each of the auxiliary training samples has an auxiliary sample output that is a transformation of a corresponding auxiliary sample input in the auxiliary training sample.

12. The method of claim 11, wherein the self-supervised machine learning task is to predict which transformation is applied to an auxiliary sample input to obtain a corresponding auxiliary sample output.

13. The method of claim 1, wherein the training of the plurality of task neural networks to optimize the combined loss function is a joint training.

14. The method of claim 13, wherein during the joint training, the combined loss function is minimized over a batch of training samples coming from the respective training data set of each of the plurality of task neural networks.

15. The method of claim 1, wherein the training of the plurality of task neural networks to optimize the combined loss function is an incremental training.

16. The method of claim 15, further comprising performing the following steps during the incremental training:
    minimizing the combined loss function over training samples from a first training data set of the received training data sets,
    freezing values of auxiliary predictor parameters of the auxiliary predictor neural network after training with training samples from the first training data set of the received training data sets, and minimizing the combined loss function over remaining training samples that are not in the first training data set while keeping the frozen values of the auxiliary predictor parameters of the auxiliary predictor neural network unchanged.

17. The method of claim 1, wherein the combined loss function is a weighted sum of the respective loss functions and the auxiliary loss function.

18. A system comprising one or more computers and one or more storage devices storing instructions that, when executed by the one or more computers, cause the one or more computers to perform operations for training a plurality of task neural networks such that the trained task neural networks are compatible with each other, wherein each of the plurality of task neural networks comprises a respective feature extractor neural network and a respective predictor neural network and is configured to perform a respective machine learning task, wherein the respective feature extractor neural network has a respective set of feature extractor parameters and the respective predictor neural network has a respective set of predictor parameters, the operations comprising:

receiving, for each of the plurality of task neural networks, a respective training data set for the respective machine learning task, the respective training data set comprising a plurality of training samples, each training sample having a corresponding sample input and a corresponding sample output;

forming an auxiliary loss function for the plurality of task neural networks, wherein the auxiliary loss function ensures that the trained task neural networks would be compatible with each other, wherein two trained task neural networks are compatible if the performance of a new neural network that is formed by combining one or more components of one of the two trained task neural networks with one or more components of the other trained task neural network on a particular machine learning task exceeds a threshold level of performance; and training the plurality of task neural networks to optimize a combined loss function, wherein the combined loss function is a combination of respective task loss functions for the respective machine learning tasks and an auxiliary loss function that encourages compatibility between the task neural networks, and wherein the auxiliary loss function measures, for each of the task neural networks, a level of performance on an auxiliary task of a new task neural network for the auxiliary task that is formed by combining the feature extractor neural network of the task neural network with a new predictor neural network for the auxiliary task.

19. One or more non-transitory computer storage media storing instructions that, when executed by one or more computers, cause the one or more computer to perform operations for training a plurality of task neural networks such that the trained task neural networks are compatible with each other, wherein each of the plurality of task neural networks comprises a respective feature extractor neural network and a respective predictor neural network and is configured to perform a respective machine learning task, wherein the respective feature extractor neural network has a respective set of feature extractor parameters and the respective predictor neural network has a respective set of predictor parameters, the operations comprising:

receiving, for each of the plurality of task neural networks, a respective training data set for the respective machine learning task, the respective training data set comprising a plurality of training samples, each training sample having a corresponding sample input and a corresponding sample output;

forming an auxiliary loss function for the plurality of task neural networks, wherein the auxiliary loss function ensures that the trained task neural networks would be compatible with each other, wherein two trained task neural networks are compatible if the performance of a new neural network that is formed by combining one or more components of one of the two trained task neural networks with one or more components of the other trained task neural network on a particular machine learning task exceeds a threshold level of performance; and training the plurality of task neural networks to optimize a combined loss function, wherein the combined loss function is a combination of respective task loss functions for the respective machine learning tasks and an auxiliary loss function that encourages compatibility between the task neural networks, and wherein the auxiliary loss function measures, for each of the task neural networks, a level of performance on an auxiliary task of a new task neural network for the auxiliary task that is formed by combining the feature extractor neural network of the task neural network with a new predictor neural network for the auxiliary task.

20. A method comprising: receiving at least two of a plurality of task neural networks that were trained by a training method, wherein each of the plurality of task neural networks comprises a respective feature extractor neural network and a respective predictor neural network and is configured to perform a respective machine learning task, wherein the respective feature extractor neural network has a respective set of feature extractor parameters and the respective predictor neural network has a respective set of predictor parameters, the training method comprising:

receiving, for each of the plurality of task neural networks, a respective training data set for the respective machine learning task, the respective training data set comprising a plurality of training samples, each training sample having a corresponding sample input and a corresponding sample output;

forming an auxiliary loss function for the plurality of task neural networks, wherein the auxiliary loss function ensures that the trained task neural networks would be compatible with each other, wherein two trained task neural networks are compatible if the performance of a new neural network that is formed by combining one or more components of one of the two trained task neural networks with one or more components of the other trained task neural network on a particular machine learning task exceeds a threshold level of performance; and training the plurality of task neural networks to optimize a combined loss function, wherein the combined loss function is a combination of respective task loss functions for the respective machine learning tasks and an auxiliary loss function that encourages compatibility between the task neural networks, and wherein the auxiliary loss function measures, for each of the task neural networks, a level of performance on an auxiliary task of a new task neural network for the auxiliary task that is formed by combining the feature extractor neural network of the task neural network with a new predictor neural network for the auxiliary task;

generating a new task neural network by combining a trained feature extractor neural network of one of the at least two task neural networks with a trained predictor neural network of the other of the at least two task neural networks;

processing, using the new task neural network, a machine learning input to generate a machine learning output without re-training the new task neural network.

21. A method comprising:

receiving one of a plurality of task neural networks that were trained by a training method, wherein each of the plurality of task neural networks comprises a respective feature extractor neural network and a respective predictor neural network and is configured to perform a respective machine learning task, wherein the respective feature extractor neural network has a respective set of feature extractor parameters and the respective predictor neural network has a respective set of predictor parameters, the training method comprising:

receiving, for each of the plurality of task neural networks, a respective training data set for the respective machine learning task, the respective training data set comprising a plurality of training samples, each training sample having a corresponding sample input and a corresponding sample output;

forming an auxiliary loss function for the plurality of task neural networks, wherein the auxiliary loss function ensures that the trained task neural networks would be compatible with each other, wherein two trained task neural networks are compatible if the performance of a new neural network that is formed by combining one or more components of one of the two trained task neural networks with one or more components of the other trained task neural network on a particular machine learning task exceeds a threshold level of performance; and training the plurality of task neural networks to optimize a combined loss function, wherein the combined loss function is a combination of respective task loss functions for the respective machine learning tasks and an auxiliary loss function that encourages compatibility between the task neural networks, and wherein the auxiliary loss function measures, for each of the task neural networks, a level of performance on an auxiliary task of a new task neural network for the auxiliary task that is formed by combining the feature extractor neural network of the task neural network with a new predictor neural network for the auxiliary task;

generating a new task neural network by combining a trained feature extractor neural network of the received task neural network with a new predictor neural network, wherein the new task neural network is configured to perform a new machine learning task; and training at least the new predictor neural network on the new machine learning task.

* * * * *